(12) United States Patent
Brouwer

(10) Patent No.: US 6,585,133 B1
(45) Date of Patent: Jul. 1, 2003

(54) LAND MARKING DEVICE

(75) Inventor: Frans P. Brouwer, Nanaimo (CA)

(73) Assignee: Top Link Ltd., Victoria (SC)

( * ) Notice: Subject to any disclaimer, the term of this patent is extended or adjusted under 35 U.S.C. 154(b) by 29 days.

(21) Appl. No.: 09/694,693

(22) Filed: Oct. 23, 2000

(30) Foreign Application Priority Data

Oct. 21, 1999 (CA) .................................................. 2287033

(51) Int. Cl.⁷ .................. B65G 59/00; B65H 03/00; G07F 11/16; B46D 25/20; G07R 17/00
(52) U.S. Cl. .................. 221/279; 221/270; 221/271; 700/242; 700/244; 73/170; 244/1
(58) Field of Search ................ 700/242, 244; 221/270, 271, 279; 73/170; 244/1

(56) References Cited

U.S. PATENT DOCUMENTS

| | | | |
|---|---|---|---|
| 2,505,950 A * | 5/1950 | Dwyer et al. | 244/136 |
| 2,610,226 A * | 9/1952 | Klaasse et al. | 175/182 |
| 2,703,417 A * | 3/1955 | Johnson | 9/8.3 |
| 3,367,181 A * | 2/1968 | Adler | 73/170 |
| 3,448,654 A * | 6/1969 | Crabtree et al. | 102/374.2 |
| 3,470,846 A * | 10/1969 | Tillay et al. | 116/124 |
| 3,586,332 A * | 6/1971 | Alban | 273/106 |
| 3,612,857 A * | 10/1971 | Beatty | 240/2.25 |
| 3,623,681 A * | 11/1971 | Ashline | 244/1 |
| 3,689,842 A * | 9/1972 | Meed | 325/114 |
| 3,702,014 A * | 11/1972 | Rabon | 9/8 |
| 3,949,731 A | 4/1976 | Caso | |
| 3,968,784 A | 7/1976 | Miller | |
| 4,008,842 A | 2/1977 | Wilson et al. | |
| 4,025,029 A | 5/1977 | Kotas et al. | |
| 4,089,318 A | 5/1978 | Hesener | |
| 4,158,306 A * | 6/1979 | Brainard, II | 73/170 |
| 4,247,281 A * | 1/1981 | McGrew et al. | 431/91 |
| 4,261,424 A | 4/1981 | Gonterman et al. | |
| 4,316,554 A | 2/1982 | Lloyd | |
| 4,388,914 A | 6/1983 | Cesin | |
| 4,531,445 A | 7/1985 | Nee | |
| 4,565,183 A | 1/1986 | Smith | |
| 4,665,885 A | 5/1987 | Glomski et al. | |
| 4,696,134 A * | 9/1987 | Neaume | 52/103 |
| 4,696,281 A | 9/1987 | Nishioka | |
| 4,710,146 A | 12/1987 | Rasmussen et al. | |
| 4,747,515 A * | 3/1988 | Kasher et al. | 221/116 |
| 4,803,970 A | 2/1989 | Mattheck et al. | |
| 4,813,494 A | 3/1989 | Beard et al. | |
| 4,969,398 A * | 11/1990 | Lundwall | 102/293 |
| 4,999,816 A * | 3/1991 | Dale et al. | 367/4 |
| 5,097,912 A | 3/1992 | Bowers | |
| 5,129,383 A | 7/1992 | Rutten | |
| 5,143,572 A | 9/1992 | Hatch | |
| 5,156,137 A | 10/1992 | Clayton | |
| 5,159,760 A * | 11/1992 | Spiegel et al. | 33/227 |
| 5,234,365 A * | 8/1993 | Cooper et al. | 441/11 |
| 5,335,439 A * | 8/1994 | Horton | 43/6 |
| 5,446,468 A * | 8/1995 | Hiltz et al. | 342/386 |
| 5,461,982 A * | 10/1995 | Boyer, III | 102/513 |
| 5,490,568 A | 2/1996 | Rios et al. | |
| 5,661,257 A * | 8/1997 | Nielson et al. | 102/334 |
| 5,667,021 A | 9/1997 | Bailey et al. | |
| 5,680,853 A | 10/1997 | Clayton | |
| 5,724,954 A | 3/1998 | Smith | |
| 5,738,079 A | 4/1998 | Keller et al. | |
| 5,741,167 A * | 4/1998 | Hagerty | 441/13 |
| 5,803,060 A | 9/1998 | Skivran | |
| 5,936,233 A | 8/1999 | Nunnally | |
| 5,951,346 A * | 9/1999 | Woodall, Jr. | 441/7 |

FOREIGN PATENT DOCUMENTS

GB       2085812 A   *  9/1980  ............. B63C/9/22

* cited by examiner

*Primary Examiner*—Donald P. Walsh
*Assistant Examiner*—Michael E. Butler
(74) *Attorney, Agent, or Firm*—Pearne & Gordon LLP (57) ABSTRACT

A land marking device is disclosed. The land marking device is capable of physically marking a point on the ground for the air.

17 Claims, 6 Drawing Sheets

LAND MARKING DEVICE

FIELD OF THE INVENTION

The invention relates to a new land marking device.

BACKGROUND OF THE INVENTION

Most land surveys are performed utilizing either optical survey instruments or satellite-based, Global Positioning System (GPS) survey equipment. In traditional surveys, a line of sight must be secured in order to perform the survey. GPS survey techniques require a relatively unobstructed signal path between a reference or relay station, a satellite network and the GPS receiver. However, in some terrain, maintaining a line of sight or GPS signal quality can be difficult or impractical. Specifically, forested areas and hilly terrain provide examples of terrain that can present difficulties utilizing traditional methods of conducting the two types of surveys noted above as both types of geography obstruct either line of sight or signal strength between the satellite and/or reference station.

In the case of forested area, ground-base land surveys using optical survey equipment or GPS are difficult if not impossible in areas with trees or other vegetative cover. As such, forest cover must almost always be removed prior to the commencement of a survey of such an area. This requires use of hand-cutting or bulldozing, or a combination of the two. This can be exceedingly expensive, require a massive amount of personnel on the ground and be relatively time consuming. Alternatively, while there are methods of surveying such areas without the need to clear a line of sight, these avoidance surveys are prohibitively time consuming for many applications. As such, they fail, in most cases, to provide a cost-effective means of surveying. Moreover, avoidance surveys sacrifice accuracy. For many applications, the accuracy lost is not acceptable. Sufficient accuracy has traditionally only been achievable by clearing a line of sight.

Surveys through geographically hilly regions can also present difficulties. In these cases, alternate techniques that are relatively slow and costly must be employed to compensate for the inability to maintain a line of sight or GPS signal strength through such regions. The techniques include alternating optical survey methods, and, in some cases, incorporating inertial/GPS and barometric surveys.

Surveys encountering swamps or muskeg terrain conditions or other geographically difficult terrain including ditches, ravines, fence lines, streams or rivers, buildings etc. can be expensive, dangerous and/or time consuming. In the case of swamp or muskeg terrain, any planned surveys are, in many cases, postponed until the terrain of such areas has frozen. Of course, this further assumes that this is an environmental possibility in the area of interest.

In the case of geographic variability over a survey area, such as ditches, ravines, fence lines, streams or rivers, buildings, by way of example, a survey team must, at the same time, negotiate these obstacles during a survey. This slows the survey.

The present invention provides a land marking device to be incorporated into new system and method of aerial land surveying and land marking free of the disadvantages and limitations noted above.

SUMMARY OF THE INVENTION

It is an object of the present invention to provide a new land marking device, to be used in surveying and land marking in association with a new method of land marking.

According to one aspect of the invention, there is provided a land marking device capable of marking a survey point on the ground. The device comprises: (a) a housing adapted to be suspended from an aircraft; (b) a receptacle inside the housing, the receptacle being adapted to accommodate at least one marker in the form of a rigid elongated member, and (c) a mechanism cooperating with the receptacle for ejecting the marker from the receptacle towards the survey point, when the housing is positioned above the survey point, the mechanism being capable of applying sufficient force to the rigid elongated marker in the lengthwise direction of the marker as to propel the marker lengthwise toward the survey point with sufficient momentum as to partially penetrate the ground at or near the survey point on the ground whereby the survey point is securely marked.

The invention disclosed is a land marking device that may be used in association with the above-noted new system and method of land marking where the device is capable of marking a point on the ground. The device is comprised of an aerodynamically designed external shell that allows the device to remain stable when suspended from an aircraft. It also includes at lease one receptacle inside the shell where the receptacle accommodates a marker and provides for a means within the shell capable of ejecting the marker from the receptacle towards a point on the ground when the device is positioned above the point in question such that the ejected marker is secured at or near the point on the ground.

A further embodiment of the invention includes a bumper skirt designed to protect the shell during descent into its position above the point on the ground and its removal from that point to a subsequent point on the ground.

A further embodiment of the invention specifically provides for a receptacle that is an elongate tube.

A further embodiment of the invention provides for a marker that is a dowel.

A further embodiment of the invention provides for a hammer mechanism as the means for ejecting the marker.

A further embodiment of the invention provides for a tensioning means to drive the hammer mechanism.

A further embodiment of the invention provides for a steel spring as the tensioning means.

One of many advantages of the land marking device is that it provides, in combination with the aircraft and surveying means, a surveying method wherein a GPS signal may be maintained from the air and used to record a location of interest on the ground while the land marking device provides a marker on that location point. This is useful in a forested, obstructed or hilly survey area. Costs of such a survey should be reduced in so far as costs arising from the requirement to remove physical obstacles obstructing a line of sight or GPS signal quality is eliminated. For example, when surveying in a densely forested area, timber need not be cleared prior to the survey. This can result in savings on the order of several thousands of dollars per kilometer of surveyed area. Moreover, this results in significant environmental benefits as well as economic benefits. Also, the time required to conduct the survey through an area heavily forested or defined by hilly geography is greatly reduced.

Also, the method and system for aerially marking the ground using the subject invention is quicker and competitive with ground-based surveys where geographic obstructions arise on a survey site that slow ground-based crews. The use of the air-based land marking device will result in a survey that is not affected by difficulties in accessing and maneuvering through surveyed locations with obstacles, such as swamps, ravines, streams, buildings, fences, rivers, ditches, etc. The ground staking device is capable of laying out and recording a large amount of survey data in difficult or variable terrain in a relatively short time period when compared with conventional ground-based survey instruments. It is estimated that the land marking device, when used in association with an aircraft, provides for a surveying method wherein an area can be surveyed in a fraction of the time required to conduct a ground-based optical survey with little or no penalty in the accuracy of the resulting survey.

The land marking device can be utilized in many contexts, such as, by way of example, the oil and gas industry, civil engineering, mining and forestry. It can be applied, for example, to marking and/or surveying of boundaries, pipelines, oil/gas leases, seismic lines, open pit mines, roads, creek crossings, ordinary line features, etc. It can be used in all applications when land marking and/or surveying is carried out using traditional measuring and marking devices.

BRIEF DESCRIPTION OF THE DRAWINGS

The enclosed drawings illustrate one preferred embodiment of the land-marking device according to the invention.

DETAILED DESCRIPTION OF THE PREFERRED EMBODIMENTS

In a preferred embodiment, the land marking device is designed to be suspended from an aircraft during survey operations.

In operation, an aircraft guides the land marking device to a location to be surveyed and after positioning the land marking device where desired with assistance from a surveying technique such as the Global Positioning System (GPS), the marking device is lowered to the ground over a point of interest and a marker is deployed from the land marking device to mark at or near that point of interest. The horizontal and vertical components of the marker are then recorded utilizing GPS data.

In one embodiment, a dowel is ejected from the device that penetrates the ground such that the stake remains far enough out of the ground to allow it to provide a useful usually detectable location marker and far enough in the ground that it is adequately secured in the ground. In a second embodiment, a paint mark is directed to the ground where it stains the location of interest on the ground. The marked or surveyed coordinates are then recorded.

While the embodiment just described contemplates marking the ground with a dowel or paint, the invention is not limited to this means of marking alone. The land marking device can be designed to secure a marker on the ground that provides an acoustic, electromagnetic, radioactive or other suitable beacon. As long as the marker is detectable by visual, audio or other means and can be practicably secured by the land marking device onto or into the ground, it will serve its purpose as a land marker.

Figure 1:
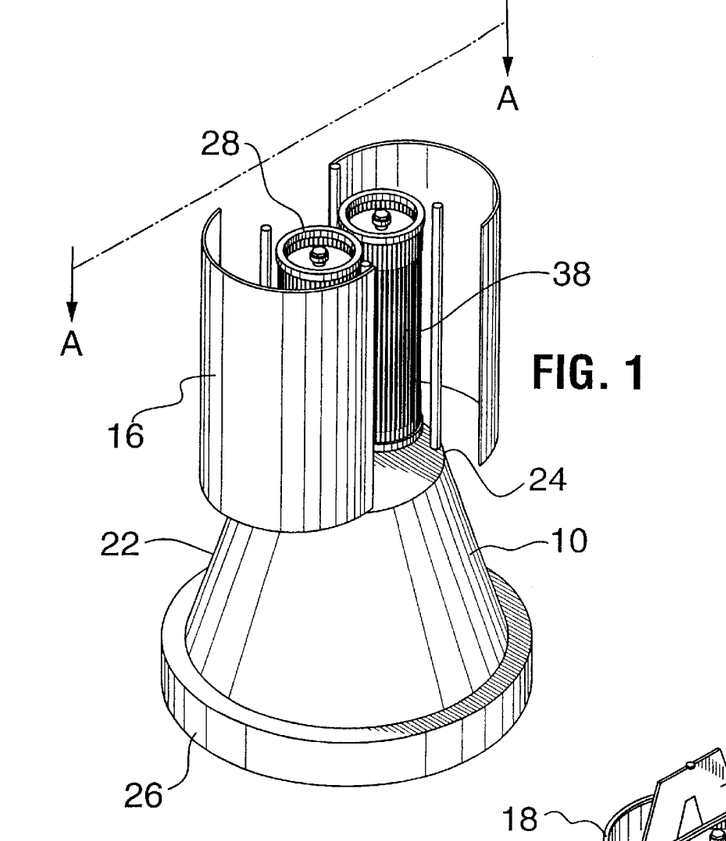
FIG. 1 shows a perspective view of an embodiment of the land marking device with an exploded view of the external shell of the land marking device.
Figure 2:
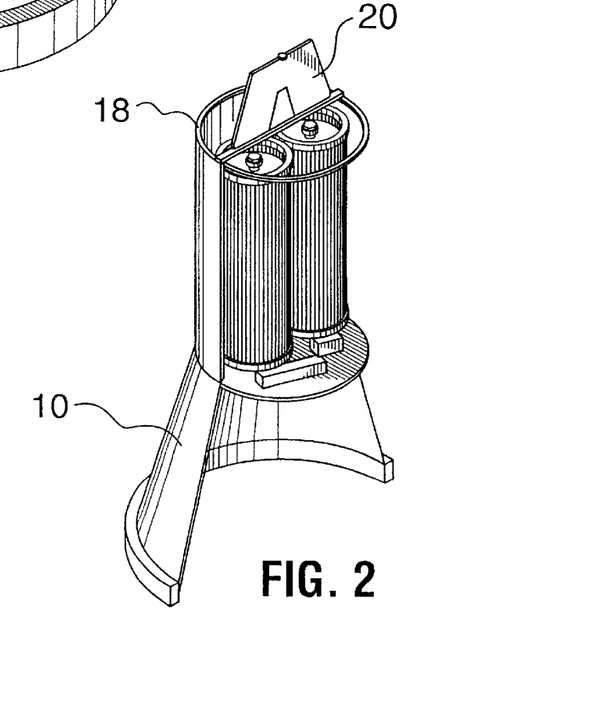
FIG. 2 shows a perspective, partial cut-away view of an embodiment of the land marking device along the line A—A from FIG. 1.
Figure 4:
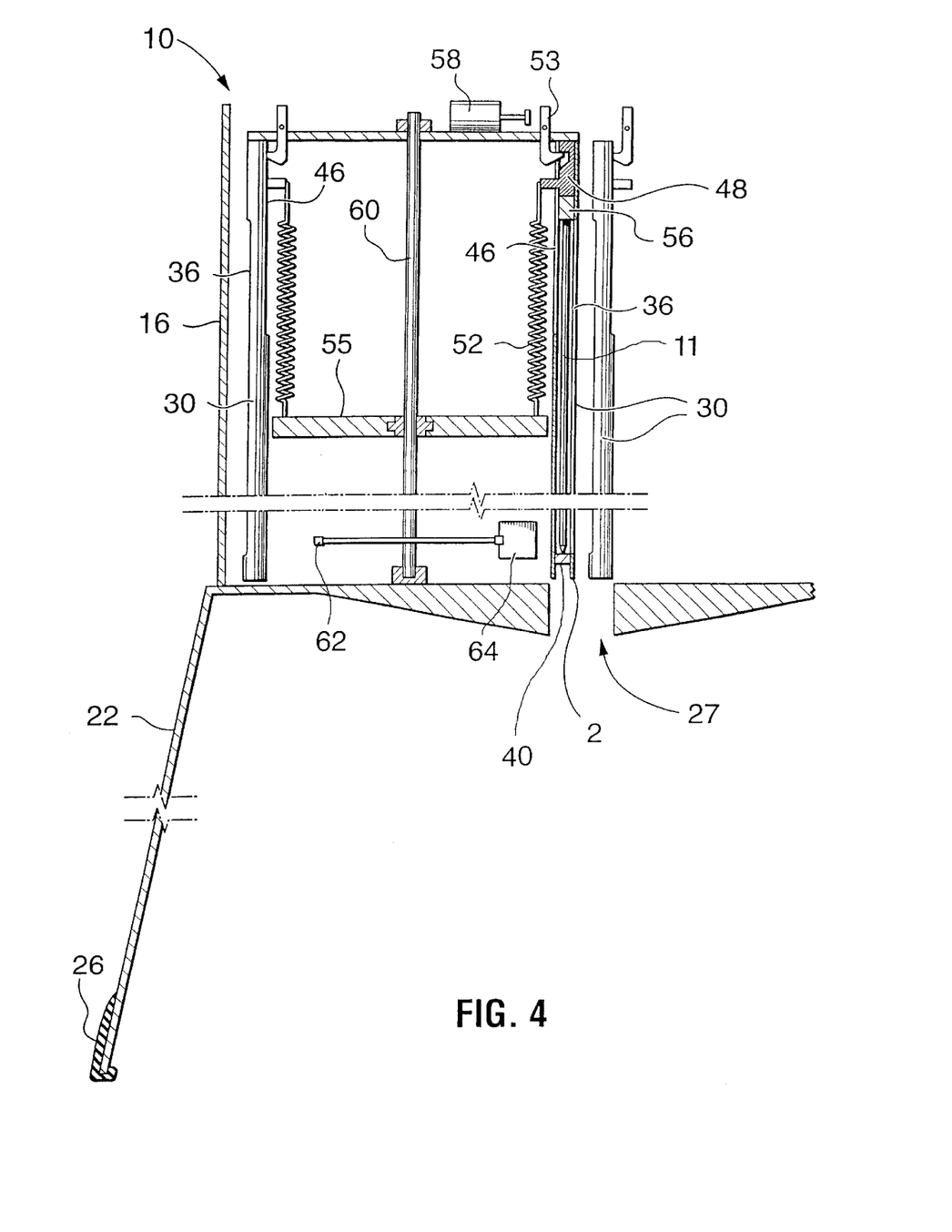
FIG. 4 shows a cross section of the land marking device along the line A—A from FIG. 1.

Referring to FIGS. 1, 2 and 4, a preferred embodiment of the land marking device 10 is shown. The land marking device 10 shown ejects a wooden dowel through a firing hole in the centre of the base of the device 10. The dowel travels into the ground from the height of approximately one meter. The dowel penetrates the ground to a depth that secures the dowel into the ground while, at the same time, maintaining a length of the dowel out of ground such that it remains visible to a ground-based operator.

The land marking device 10 is enclosed in an aerodynamically designed external shell 16 which allows the device to hang stable on a long line, in full sight from the aircraft when suspended from a helicopter. The external shell 16 is generally cylindrical.

Figure 6:
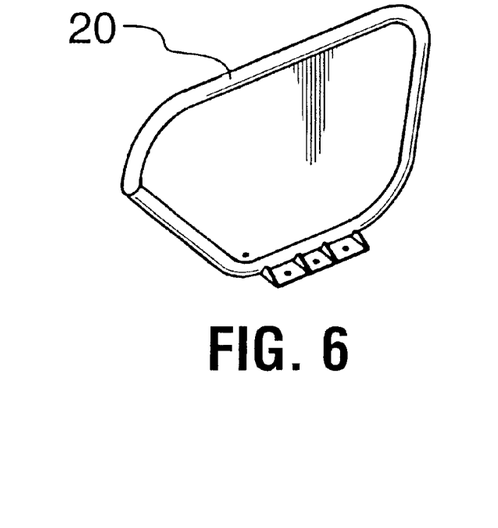
FIG. 6 is perspective view of the wing.

Referring to FIG. 2, a stabilizer is provided at the top part 18 of the external shell 16, to improve its aerodynamics and to ensure that the marking device 10 moves beneath and with the helicopter in a balanced fashion when suspended. In a preferred embodiment, as shown in FIG. 6, a wing assembly 20 acts as a stabilizer. The assembly 20 is secured to the shell 16 to help provide an aerodynamic ride to the land marking device 10 when in use. The present invention, is not limited to the wing assembly shown. Acceptable aerodynamics may be maintained without the use of a wing assembly.

Figure 7:
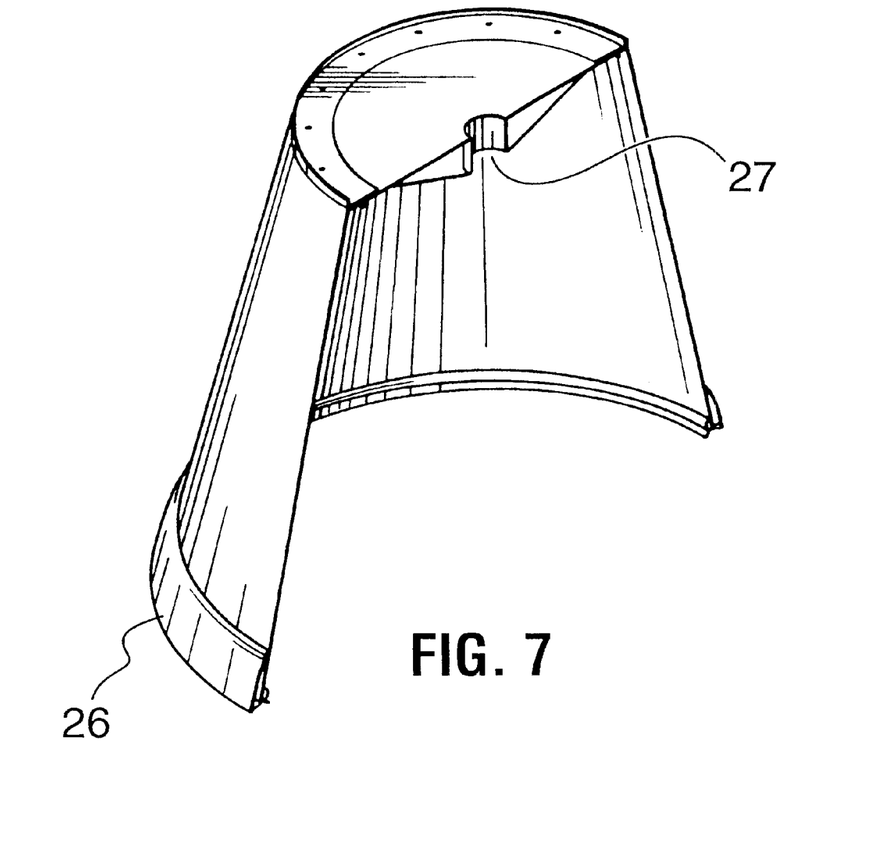
FIG. 7 is an perspective cross sectional view of the bumper skirt.

Referring to FIGS. 1 and 7, the land marking device 10 includes a bumper skirt 22 attached around the lower end 24 of the external shell 16 of the device 10. When the helicopter lowers the device towards the ground, the bumper skirt 22 protects the lower portion of the land marking device 10 from incidental impact occurring with the ground or trees and shrubs by absorbing the impact inevitable when the device is lowered through trees to the ground to mark a point on the ground. The bumper skirt 22 includes a bumper rim 26 to absorb ground impacts. Preferably, the rim is made of rubber, however, it may be made of other shock absorbing material.

Note on FIGS. 4 and 7, that the firing hole 27 is shown.

Figure 3:
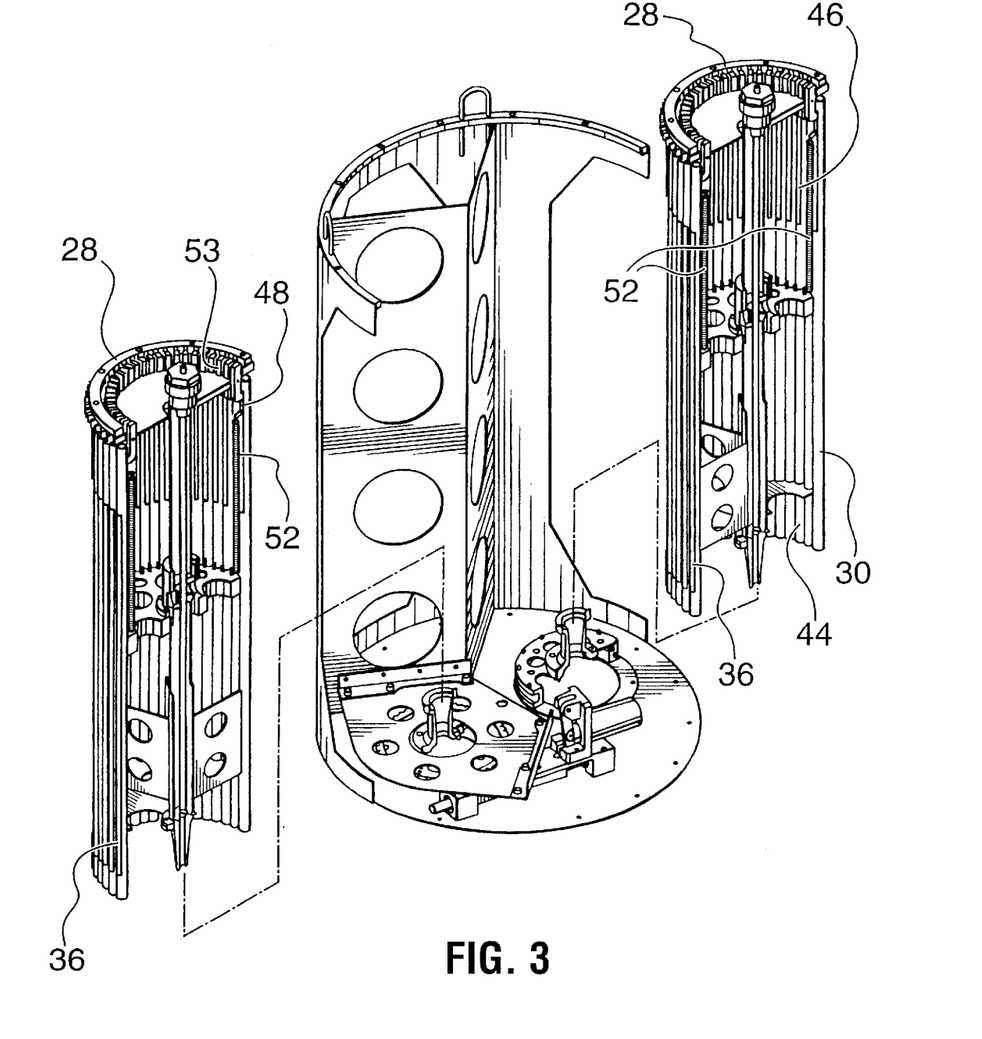
FIG. 3 shows a perspective, cut-away and exploded view of the external shell and barrels of an embodiment of the invention along the line A—A from FIG. 1.
Figure 5:
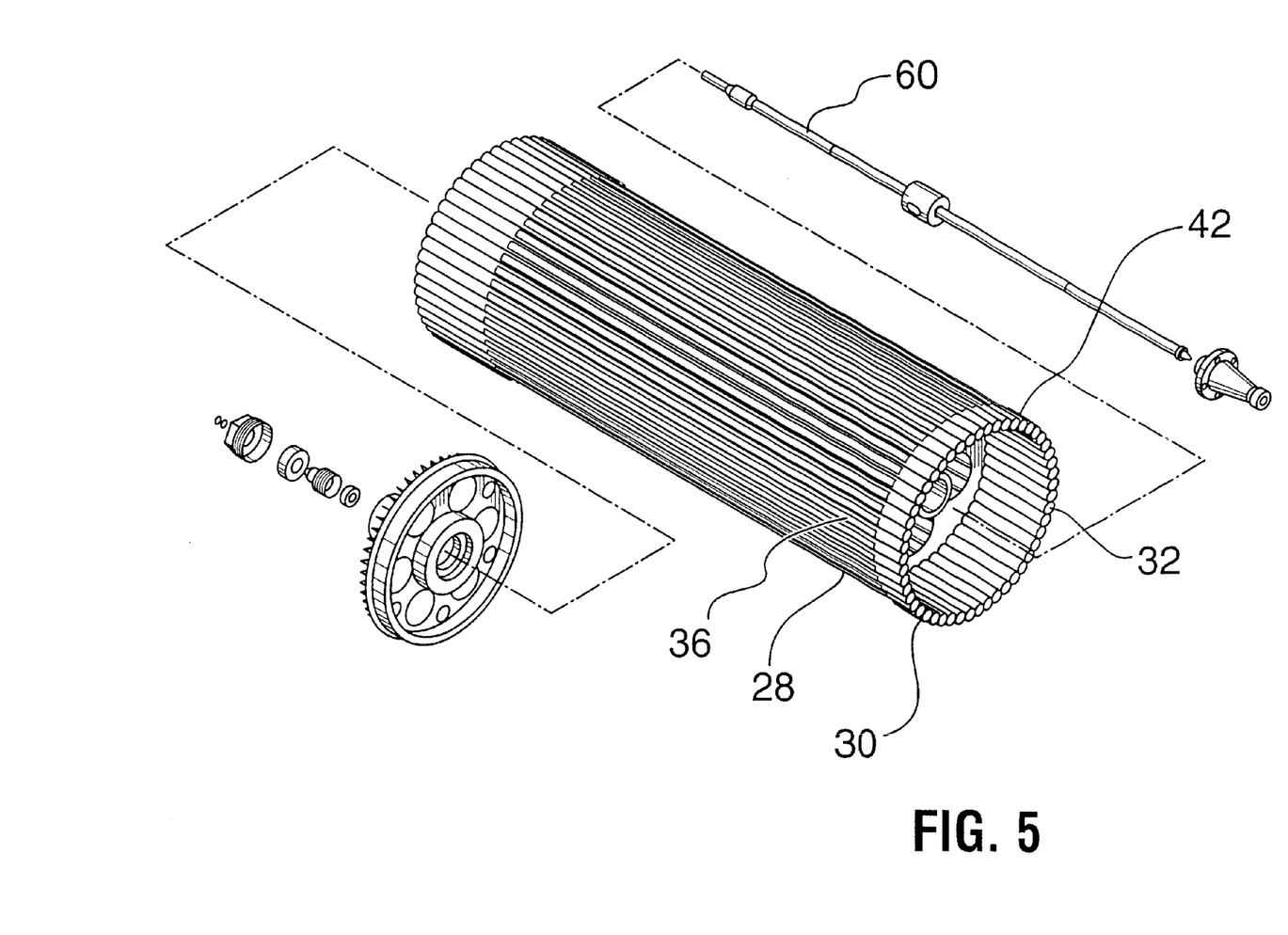
FIG. 5 is a perspective exploded view of the barrel.

Referring to FIGS. 1, 3 and 5, a preferred embodiment of the land-marking device 10 further contains one or more internal circular barrels 28 positioned inside the external shell 16. The internal barrels 28, which, in the embodiment shown, but not limited to the embodiment shown, are approximately 1 meter in height, consisting of a plurality of specially designed tubes 30 each holding disposable dowels used for land marking.

The tubes 30 are arranged on the outer perimeter of a disc 32 and form the barrel 28 in which the markers are housed and from which the markers are launched. In the embodiment shown, two barrels are arranged to meet each other, each made up of 50 tubes 30. Therefore, in the embodiment shown, 100 dowels are available between loadings.

The external shell 16 of an embodiment of the land marking device 10 has at least one access door. When opened, these doors provide access to the adjacent internal barrel or barrels 28 and its tubes 30. Access may also be provided through the same door or one or many alternative doors, to electronics or other components housed in the shell.

Each tube 30 has a dowel-loading slot 36 cut out axially from the wall 38 facing the access door. The slot 36 is large enough to be used for inserting into the tube 30 a dowel. In the embodiment shown, the dowel is approximately 90 cm in length. The dowel may be retained in the tube 30 by a disk that may be made of, by way of example but not limited to, a strong paper or a similar material, which disk is inserted in a slot cut out radially at the lower end 42 of the tube 30.

Figure 8:
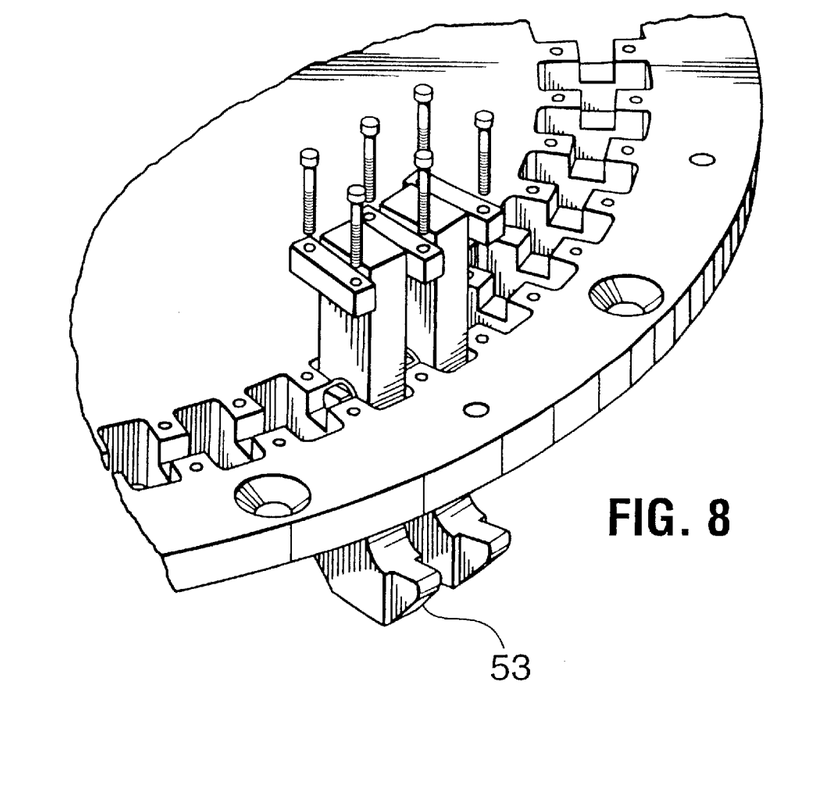
FIG. 8 is a close-up perspective view of the trigger means.

Referring to FIGS. 3, 4 and 8, on the side 44 opposite the dowel-loading slot 36, each tube has another narrow slot 46 cut out. This slot guides a hammer mechanism 48 axially along an upper length 50 of each tube 30. The hammer mechanism 48 is attached to a tensioning means that, in the embodiment shown, runs axially along each tube towards the inside of the barrel and adjacent to a given tube. In the embodiment shown the tensioning means is a steel spring 52. The hammer mechanism 48 and steel spring 52 are designed in such a manner that the hammer mechanism 48 can be tensioned and locked in the cocked position by a trigger arm 53 while the spring 52 is anchored to the tensioner assembly 55. In this cocked position, a hammerhead 56, which is part of the hammer mechanism 48 and which is positioned inside the tube 30 above the dowel, is ready to strike the top of the dowel.

The hammer mechanism 48 is activated by a solenoid 58. When the solenoid 58 is energized, it causes the tensioned hammer mechanism 48 to be released. The hammerhead 56 then strikes the top of the dowel. The impact of the hammerhead 56 ejects the dowel. The dowel perforates the disk 40. The solenoid is positioned such that it activates a single hammer mechanism. Only the dowel in the tube that is positioned above the firing hole 27 will be activated. As such, only this down will and can be ejected through the hole 27.

Of course, various different means can be employed to secure a marker into the ground beyond the spring hammer mechanism set out in the disclosure. These may include chemical reacted firing mechanism, hydraulic mechanisms, and others.

Generally, the tensioning means may be designed to eject the dowels at various velocities. The ejection force can be adjusted depending on the ground conditions (soft ground, hard ground, frozen ground, swamp, etc.).

Referring to FIGS. 4 and 5, the embodiment shown demonstrates that each barrel 28 of tubes 30 inside the external shell 16 is centered on an axle 60 and an indexing gear 62. Each indexing gear 62 is designed such that an index mechanism 64 can be utilized to advance each barrel 28 a specific distance. As such, one tube 30 from each barrel 28 lines up with the firing hole 12. The index mechanism 64 also prevents overshooting of the dowel and positions the dowel accurately over the firing hole 12 ensuring the accurate marking of the desired location.

Figure 9:
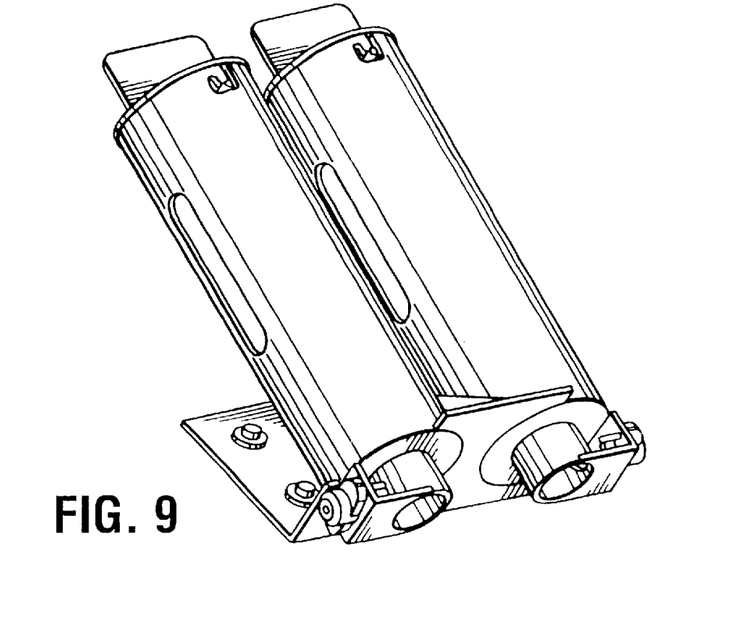
FIG. 9 is a perspective view of the paint receptacles.

Referring to FIG. 9, inside the land marking device 10, a space is provided for a compressed air cylinder and a receptacle 70 containing paint or other indelible marker. One such space may be the skirt. Here, the paint receptacle and cylinder are encased in a protective housing. A portion of the paint from the paint receptacle 70 may be ejected from the land marking device 10 by compressed air, using a provided discharge mechanism, to mark a location with paint as an alternative to marking with a dowel.

Both the barrels 28 and tubes 30 are housed in the shell 16 in such a manner that they are well protected. The air cylinders and paint receptacles 70 if inside the shell are also well protected. The bumper skirt 22 as well as the base 14 of the shell 16 protect the internal components of the land staking device 10 from sticks, trees or any other debris. The shell 16 is generally designed to protect the internal components from impacts during operation from the top and sides as well.

An inclinometer may be mounted on the land marking device 10. This is used to monitor the horizontal pitch of the land marking device 10 at any point during use. It is especially important when determining the pitch of the land-marking device just prior to marking a point. The land marking device needs to be relatively level prior to firing of the marker in order to ensure that the marker is accurately placed and properly secured at the desired location.

Other monitors may also be included in the land marking device. These might include information related to the number of markers remaining, the temperature of the paint housing, display of the hook or cord tension when supporting the marking device, the status of the digital inclinometer situated on the land marking device, status of the doors, etc. Generally, it is useful to have the monitors capable of remotely communicating with a computer on-board the aircraft and/or a ground-based operator.

A light may also be installed along with a camera within the bumper skirt. This can allow an operator to visually monitor whether the land marker accurately and adequately marked the location of interest before moving on to the next site. As the bumper skirt effectively blocks sunlight from entering and eliminates the location point, it is important that some means be provided to illuminate the area within the bumper skirt. An alternative means includes providing sunlight holes in the skirt to let sunlight illuminate the survey point.

The land marking device generally, should be constructed of the lightest and, at the same time, sturdiest material practicable. During use, the land marking device 10 encounters significant impact from trees and other debris and the ground. Also, given the varying environmental conditions in which the land marking device will be used, it is important that the device be made from material that resist rusting and other environmental conditions. Aluminum and stainless steel are preferably used however, other suitable materials may be substituted.

The overall design of the marking device ensures its reliable operation at extreme temperatures and in the presence of hostile environmental agents such as dust, moisture, etc. The device is lightweight in design and can be deployed with a medium sized helicopter. Moreover, it can be moved between various deployment places using almost any vehicle.

In order to provide further assistance, and purely for illustrative purposes, some specifications of one embodiment of the invention are provided below.

| Key Dimensions of Land Marking Device | |
|---|---|
| Shell Diameter: | 0.715 m |
| Skirt Diameter (Base): | 1.2 m |
| Spring Tension: | 0–15 lbs |
| Dowel Capacity: | 100 dowels |
| Construction Material: | Aluminum |

Although various embodiments of the present invention have been described above for purposes of illustration, it would be apparent to those skilled in the art that numerous variations may be made thereto without departing from the spirit and scope of the invention, as defined in the appended claims.

What is claimed is:

1. A land marking device capable of marking a survey point on the ground, said device comprising:
   (a) a housing adapted to be suspended from an aircraft;
   (b) a receptacle inside the housing, the receptacle being adapted to accommodate at least one marker in the form of a rigid elongated member; and
   (c) a mechanism cooperating with the receptacle for ejecting the marker from the receptacle towards the survey point, when the housing is positioned above the survey point, the mechanism being capable of applying sufficient force to the rigid elongated marker in the lengthwise direction of the marker as to propel the marker lengthwise toward the survey point with sufficient velocity as to partially penetrate the ground at or near the survey point on the ground whereby the survey point is securely marked.

2. A device according to claim 1, wherein said receptacle is adapted to accommodate a plurality of said markers and said mechanism is adapted to eject each marker one at a time.

3. A device according to claim 1, wherein said receptacle includes a plurality of elongated tubes, each being adapted to contain a respective marker.

4. A device according to claim 3, wherein each said elongate tube includes a first elongated slot for loading of said marker and a second slot for providing an access opening for said mechanism so that the latter can apply an ejection force to the marker.

5. A device according to claim 3, wherein said plurality of elongated tubes together form a barrel, said barrel being rotatably mounted, and an indexing means being provided for rotating said barrel and advancing the elongated tubes one at a time to an ejection position.

6. A device according to claim 1, wherein said housing has a base with a hole therein, the hole being located at the ejection position.

7. A device according to claim 1, wherein said mechanism for ejecting the marker may be adapted to vary an ejection force depending on the condition or hardness of the ground to be penetrated by the marker.

8. A device according to claim 1, wherein said mechanism is a hammer mechanism.

9. A device according to claim 8, wherein said hammer mechanism is operatively connected to a spring which supplies an ejection force thereto.

10. A device according to claim 1, further comprising a bumper skirt attached to the housing for protecting the marking device from impact when positioning it on the ground.

11. A device according to claim 10, wherein said bumper skirt includes a bumper rim along the bottom edge of the skirt, the bumper rim being made of a shock absorbing material.

12. A device according to claim 10, wherein said bumper skirt includes a sidewall having a sunlight hole formed therein.

13. A device according to claim 1, further comprising a stabilizer attached to the housing to assist, in use, in stabilizing the housing when suspended from an aircraft.

14. A device according to claim 1, further comprising an inclinometer for measuring the horizontal pitch of the marking device when in use.

15. A device according to claim 1, further comprising a camera for monitoring the operation of the marking device.

16. A device according to claim 1, further comprising means for further marking the survey point with a paint marker.

17. A device according to claim 16, wherein said further marking means comprises a paint receptacle and a compressed air cylindrical wherein the paint from the paint receptacle is ejected towards the survey point by the compressed air of the air cylinder.

* * * * *

UNITED STATES PATENT AND TRADEMARK OFFICE
CERTIFICATE OF CORRECTION

PATENT NO. : 6,585,133 B1
DATED : July 1, 2003
INVENTOR(S) : Frans P. Brouwer

It is certified that error appears in the above-identified patent and that said Letters Patent is hereby corrected as shown below:

Column 7,
Line 26, please delete "elongate", and insert therefor -- elongated --.

Signed and Sealed this

Seventh Day of October, 2003

JAMES E. ROGAN
*Director of the United States Patent and Trademark Office*